B. BERGER.
FILTRATION FAUCET.
APPLICATION FILED AUG. 14, 1911.
1,047,137.
Patented Dec. 10, 1912.
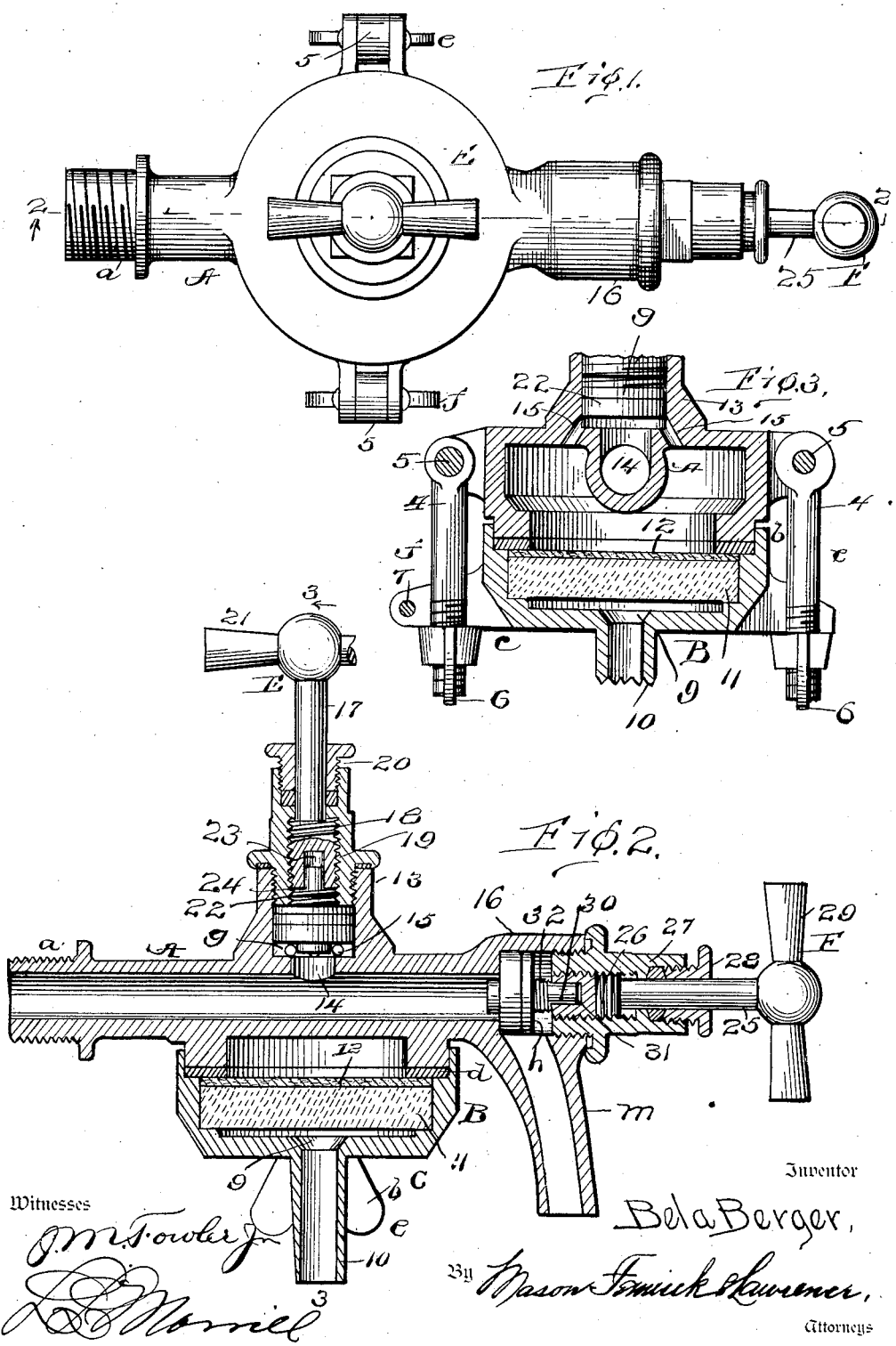

UNITED STATES PATENT OFFICE.

BELA BERGER, OF DENVER, COLORADO.

FILTRATION-FAUCET.

1,047,137. Specification of Letters Patent. Patented Dec. 10, 1912.

Original application filed May 2, 1910, Serial No. 559,027. Divided and this application filed August 14, 1911. Serial No. 643,943.

*To all whom it may concern:*

Be it known that I, BELA BERGER, a citizen of the United States of America, residing at Denver, in the county of Denver and State of Colorado, have invented certain new and useful Improvements in Filtration-Faucets; and I do hereby declare the following to be a full, clear, and exact description of the invention, such as will enable others skilled in the art to which it appertains to make and use the same.

This invention relates to filtration faucets; and it has for its object to provide improvements in faucets of the character stated which will be superior in point of positiveness in operation, convenience and facility in control and operation, and adaptability to varying conditions of use, and which will be generally superior in point of serviceability.

This application is a division of the application resulting in Patent Number 990,695, issued April 25, 1911.

This invention consists in the provision, construction, combination, association and relative arrangement of parts, members and features, all as hereinafter described, shown in the drawing, and finally pointed out in claims.

In the drawing:—Figure 1 is a top plan view of a filtration faucet constructed and organized according to the invention; Fig. 2 is a vertical sectional view of the same, taken upon the line 2—2, Fig. 1, and looking in the direction of the appended arrows; and Fig. 3 is a vertical transverse sectional view of the same, taken upon the line 3—3, Fig. 2, and looking in the direction of the appended arrows; parts being omitted and broken away for clearness of illustration.

Corresponding parts in all the figures are denoted by the same reference characters.

Referring to the drawing, the letter A designates a tubular body which is threaded at one end, as at $a$, for connection with a service pipe, and is provided at the opposite end with a discharge nozzle or spout $m$. At an intermediate point in its length the tubular body A is shown as provided with a filtration cup B which comprises a member $b$ integral with the body A and a detachable member $c$ beneath the same, a packing $d$ being interposed between the said members. Clamping means, $e$ and $f$, are provided for holding together the members $b$ and $c$, and each of the said clamping means may comprise a bolt 4 pivotally connected at 5 with the member $b$ and provided at its free end with a wing nut 6 adapted to engage a member 7 upon the lower member $c$. The bottom of the member $c$ may be provided with a central orifice 9 from which depends a spout 10 through which the filtered liquid is discharged, a filtering block 11 being arranged within the member $c$ over the discharge spout and the upper surface of the filtering block being covered by a layer 12 of asbestos. This filter may be of any suitable construction, since it constitutes no part of the present invention, the said invention residing in the valve for controlling the supply of water to the filter and the discharge of water through the spout $m$.

Located directly above the filtration casing B is a valve casing 13, the lower end of the valve casing communicating with the interior of the tubular body portion A through the opening 14, while opposite sides of the valve casing communicate through a plurality of lateral ports 15 with the top of the filtration casing. A somewhat similar valve casing 16 is provided at the point of communication of the tubular body A with the delivery spout $m$, and valves $g$ and $h$ respectively are slidably mounted within the valve casings 13 and 16 so as to control the end and side openings thereof.

E designates the valve mechanism for the valve $g$, and F designates the valve mechanism for the valve $h$.

The valve mechanism E comprises a valve stem 17 the inner end of which has a threaded connection, as at 18 with and within a nipple 19 which is threaded into the valve casing 13 so that the inner end thereof is spaced from and parallel to the back of the valve $g$. A stuffing box 20 is shown as provided at the upper end of the nipple 19, and the upper end of the valve stem 17 is provided with a handle or hand grasp 21 while the inner end of the valve stem is formed with a socket 23 loosely receiving a valve spindle 22 projecting axially from the back of the valve $g$. A coil spring 24 surrounds the valve spindle 22 and is interposed between the inner end of the stem 17 and the valve so as to normally tend to force the valve downwardly and cause the valve to close the opening 14. The valve mechanism F is substantially the same in construction and comprises a valve stem 25 the inner end of which has a threaded connection, as at 26, with and within a nipple 27 which is threaded into the outer end of the valve casing 16 so that the inner end thereof is spaced from and parallel to the back of the valve h. A stuffing box 28 is provided at the outer end of the nipple 27, and the outer end of the valve stem 25 is provided with a handle 29, while the inner end of the said valve stem is formed with a socket 31 loosely receiving a valve spindle 30 projecting axially from the back of the valve h. A coil spring 32 surrounds the spindle 30 and is interposed between the inner end of the stem 25 and the valve h so as to normally tend to force the valve away from the inner end of the valve stem.

The operation, method of use and advantages of the improvements in filtration faucets constituting the invention will be readily understood from the foregoing description, taken in connection with the accompanying drawing and the following statement. With the parts in the positions shown in the drawing, liquid entering the tubular body A is free to traverse the port 14 into the valve chamber 13, and thence to flow through the ports 15 into the filtration casing or shell B, passing through the asbestos sheet 12 and the porous block 11 successively, and thence through the orifice 9 and the spout 10. This course of the liquid through the faucet is permitted by the elevation of the valve stem 17, which permits the fluid to press against the under side of the valve g and raise it against the opposition of the tension means or spring 24. The communication of the tubular body A with the delivery spout m is prevented by the seating of the valve h in its casing 16, the valve stem 25 being adjusted in its nipple so as to hold the valve in its seated position under high tension of the spring 32. Thus, any fluid entering the tubular body A is prevented from exit therefrom save after the filtering action of the asbestos sheet 12 and the porous block 11. If, now, the valve stem 17 be manipulated to positively seat the valve g and close the ports 15 and the port 14, no liquid can pass through the faucet. If, further, the valve stem 25 be manipulated to diminish the pressure of the tension means or spring 32 upon the valve h, liquid entering the tubular body A under pressure will unseat the valve h and find its way into the delivery spout m. It is manifest that both valves g and h may be simultaneously closed or seated, or simultaneously unseated, or that either of the same may be unseated while the other is seated, in accordance with predetermination as to use of the filtration casing B and the delivery spout m, either separately or simultaneously, or in accordance with the non-use of both of the same, as may be desired. Thus, the faucet may deliver both filtered and unfiltered liquid at the same time, or either filtered or unfiltered liquid, or neither of the same.

The provision of the tension means or springs 24 and 32, disposed respectively between the valve g and its stem and the valve h and its stem, enables a more delicate adjustment of faucet conditions, as the yield of each spring may be utilized against the pressure of the liquid in the faucet, to entirely overcome said pressure and prevent flow, or to permit flow under fine gradations of regulation.

What I claim is:

1. In a faucet, a tubular member, a chamber formed beneath the tubular member and communicating with the tubular member by an opening formed in the top of the tubular member and through laterally extending passages to the chamber, and a valve positioned to close the opening in the top of the tubular member.

2. In a faucet, a tubular member having a discharge spout at its extremity and an opening in its upper side intermediate its ends, a valve positioned to close the outlet to the spout, a chamber formed beneath the tubular member and beneath the intermediate opening, said opening communicating with said chamber by means of lateral passages, and a vertically arranged valve positioned to close the intermediate opening from the tubular member.

3. In a faucet, a tubular member having an opening in its upper side, lateral passages extending from such opening upon opposite sides of the tubular member and communicating with a chamber, a discharge spout upon the lower side of the chamber under the tubular member, and a valve positioned to close the passage from the tubular member.

4. In a faucet, a tubular member having an opening at one end and a second opening intermediate its ends, a valve controlling the opening at the end of the tube, passages extending from the intermediate opening through the tubular member to a filter, and a valve to control the passage to the filter.

In testimony whereof I affix my signature in presence of two witnesses.

BELA BERGER.

Witnesses:
L. SELIGSOHN,
NELLIE M. ASH.

---

Copies of this patent may be obtained for five cents each, by addressing the "Commissioner of Patents, Washington, D. C."